United States Patent [19]

Coulter et al.

[11] Patent Number: 5,062,048
[45] Date of Patent: Oct. 29, 1991

[54] STRETCH CORRECTED WIRELINE DEPTH MEASURING ERROR AND LOG QUALITY INDICATOR METHOD AND APPARATUS

[75] Inventors: Kenneth T. Coulter, Katy; Kenneth R. Goodman, LaPorte, both of Tex.

[73] Assignee: Halliburton Logging Services, Inc., Houston, Tex.

[21] Appl. No.: 387,746

[22] Filed: Aug. 1, 1989

Related U.S. Application Data

[63] Continuation of Ser. No. 134,414, Dec. 17, 1987, abandoned.

[51] Int. Cl.⁵ .......................... G01B 7/02; G01V 3/18
[52] U.S. Cl. ..................................... 364/422; 364/562; 364/571.02; 73/151.5; 166/250; 166/66.5; 324/346; 340/860; 340/854
[58] Field of Search .......... 364/422, 562, 508, 571.04, 364/565, 804, 571.02; 324/206, 332, 333, 345, 346; 73/151.5; 166/250, 66.5; 175/40; 250/256, 261; 340/854, 860, 861

[56] References Cited

U.S. PATENT DOCUMENTS

| | | | |
|---|---|---|---|
| 2,782,515 | 2/1957 | Mayes | 33/735 |
| 3,490,149 | 1/1970 | Bowers | 33/735 |
| 3,497,958 | 3/1970 | Gollwitzer | 33/735 |
| 4,179,817 | 12/1979 | Lavigne et al. | 33/735 |
| 4,282,523 | 8/1981 | Youmans | 340/860 |
| 4,545,017 | 10/1985 | Richardson | 364/422 |
| 4,718,168 | 1/1988 | Kerr | 364/562 |
| 4,791,618 | 12/1988 | Pruchnik | 367/25 |
| 4,852,263 | 8/1989 | Kerr | 364/562 |

FOREIGN PATENT DOCUMENTS 5112  7/1988  World Int. Prop. O. .......... 364/422

Primary Examiner—Parshotam S. Lall
Assistant Examiner—V. Trans
Attorney, Agent, or Firm—William J. Beard

[57] ABSTRACT

A stretch corrected wireline depth measuring system is set forth including method and apparatus. It forms a log quality indication which indicates those occasions where the tool velocity is outside acceptable limits. The apparatus utilizes calibrated encoder wheels, preferably a redundant and duplicate pair, to form pulse trains indicative of surface wireline velocity. Additional measurements are made of wireline tension, and magnetic marks on the wireline are observed. All of this data is input to a CPU which determines the raw depth, and adjusts this value with depth corrections. The device calculates wireline stretch as a function of tension and total wireline in the borehole. This enables formation of output data as a function of depth including cable tension, tool speed, depth correction and log quality in the event that tool velocity is outside an acceptable range.

10 Claims, 2 Drawing Sheets

STRETCH CORRECTED WIRELINE DEPTH MEASURING ERROR AND LOG QUALITY INDICATOR METHOD AND APPARATUS

This is a continuation of application Ser. No. 07/134,414 filed Dec. 17, 1987 now abandoned.

BACKGROUND OF THE DISCLOSURE

In making measurements in a well borehole with measuring devices supported on a wireline suspended in the borehole, errors are encountered in making depth measurements. Depth measurement errors can arise from a multitude of factors. Several of these factors are discussed in U.S. Pat. Nos. 4,117,600 and also 4,179,817. These two U.S. Patents particularly describe particular errors which may arise in such a system. One error not discussed is the error arising from stretch of the wireline and in particular stretch which occurs during ordinary operations subject to snagging. By way of background, a wireline is subject to stretch which is ordinarily a relationship primarily dependent on wireline length and tension on the wireline. However, during use, the tool supported on the wireline may snag or drag for a variety of reasons and thereby vary the tension. When tension is varied, the amount of stretch will vary. Even worse, the tool at the end of the wireline may snag; when this occurs, the wireline handling apparatus at the surface will continue to retrieve the wireline, tension will increase, and the tool will eventually snap free. When that occurs, the tool will typically jump rapidly to relax the overstressed wireline and overshoot its equilibrium position. The wireline (made of resilient material) acts as a long coil spring which oscillates the tool up and down, a motion superimposed on the linear rate of retrieval. Thus, the tool movement can be very irregular for an interval. This tendency to overshoot after snagging during retrieval creates an error in depth of the measuring instrument.

The present apparatus is a system which provides stretch corrected measurements. In addition to that, it also provides a quality indication to be recorded simultaneously with the data recorded during operation of the logging tool. This quality indication is recorded as a function of depth to thereby indicate those portions of the logged data which may be suspect because they were recorded at a location where tool movement was erratic as a result of snagging, dragging, or overshooting on release. This is particularly helpful in determining whether or not the formation data or depth is highly reliable. The interpretation of the formation data can then be enhanced because those regions of the borehole which are suspect as a result of irregular logging tool movement are labeled. Indeed, if quality indications suggest poor quality formation data, that portion of the well borehole can be relogged.

The present disclosure sets forth a method and apparatus for making measurements of cable lengths between the surface and the logging tool supported on the wireline, and in particular enables such measurements to be made and corrected for stretch to obtain a corrected depth. The corrected depth is also provided to a recorder. The signal from the logging tool is likewise provided to a recorder. The recorder optionally additionally records cable tension, tool speed, depth correction and also newly provides a quality indicator as a function of depth to enable more critical evaluation of the data from the measurement tool. The present apparatus is utilized with a magnetic mark detector which detects the passage of magnetic markings on the wireline. Moreover, cable tension is continuously measured. In addition opposing calibrated encoder wheels measure cable movement. All of this data is provided to a system which converts the measurements into depth correction, cable tension, tool speed, corrected depth forms output signals supplied to a recorder. The measurement device included in the logging tool also provides an output signal which is conveyed along the wireline to the signal conditioner for recording as a function of depth.

DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a schematic diagram of an apparatus which responds to cable tension, measurement of magnetic marks, and operation of calibrated encoder wheels to provide data to a recorder indicative of tool depth and other variables; and FIG. 2 shows several variables recorded as a function of depth in the well borehole including depth correction and showing a data quality indicator to assist in log interpretation.

DESCRIPTION OF THE PREFERRED EMBODIMENT

Figure 1:
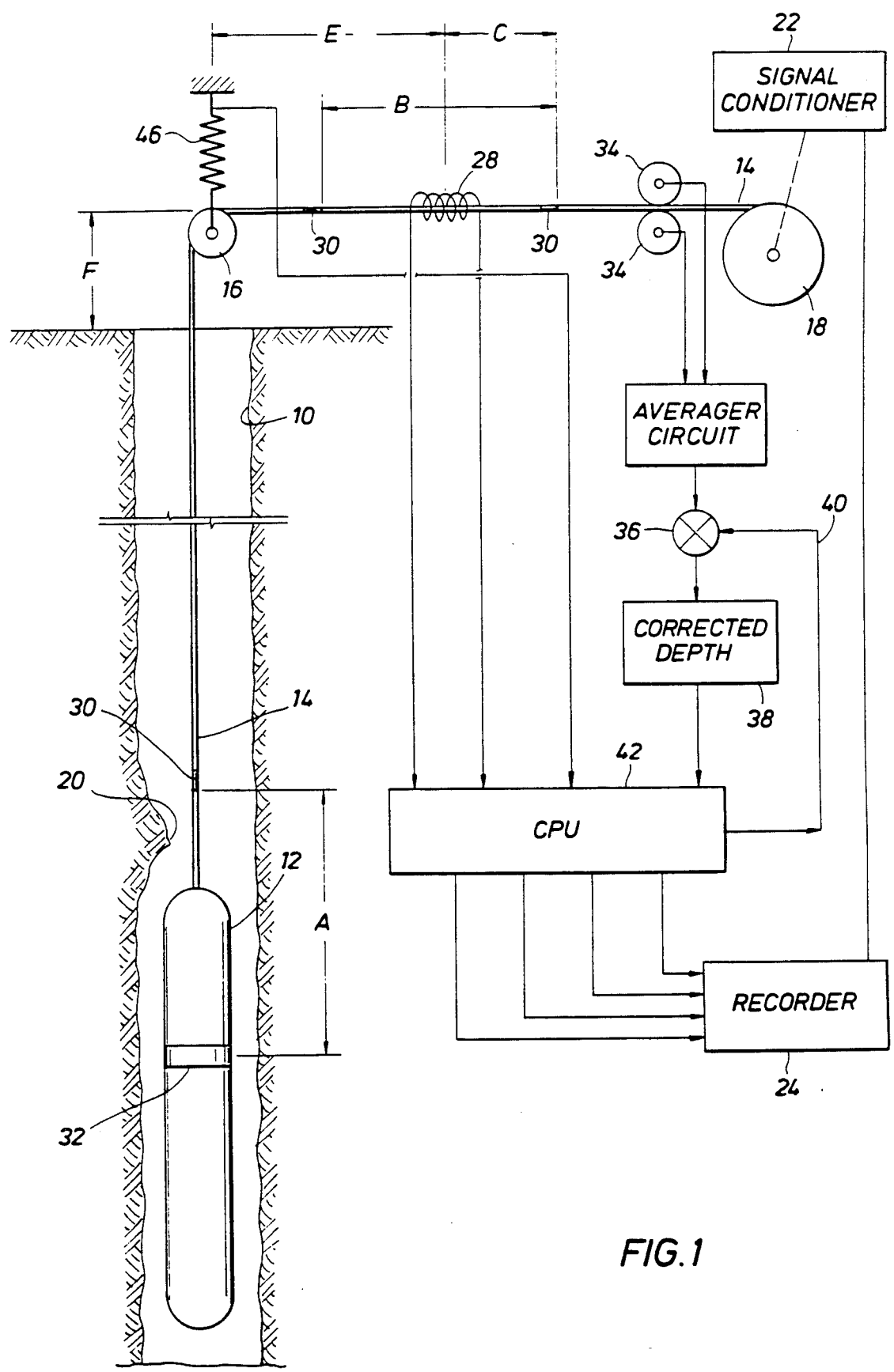

In FIG. 1 of the drawings, a well borehole 10 extends to any selected depth. The well can be cased or open hole as desired. The present apparatus can be used in either circumstance. The numeral 12 identifies a sonde which encloses one or more logging tools. The logging tools perform various measurements which are performed as a function of depth. The measurements which are obtained from the instruments within the housing of the sonde are encoded as signals provided on one or more conductors in a logging cable 14. This cable is made of one or more electrical conductor pairs along with a multi-strand cable which collectively forms the wireline 14. As desired, it can be an armored logging cable. The cable 14 will be described as a wireline hereinafter without regard to its particular composition. It is several thousand feet in length, and is preferably slightly longer than the borehole depth. Since wells can be drilled to depths of 25,000 feet or more, it is not unusual for the cable to be this long or longer. The cable 14 passes over a sheave 16 located at the well head. Various lubricators or stuffing boxes may be included to enable the cable to pass into the borehole 10 The cable 14 is spooled onto a cable reel having the shape of a large drum 18. Ordinarily, the sonde 12 is lowered to the very bottom of the well. After it has been lowered to the maximum depth, it is then retrieved. During retrieval, it may snag on an obstacle 20 which is exemplified in FIG. 1 of the drawings. When it snags, the sonde depth will not track movement by the reel 18 as the wireline 14 is retrieved by the reel 18. The cable may stretch somewhat, but it typically will pull free of the obstacle 20 jumping quickly upwardly as it overcomes snagging on the obstacle 20. It may catch on the obstacle 20 or it may simply drag, thereby increasing the relative load on the wireline. In either case, this may create variations in cable tension.

The electrical conductors in the wireline are provided to a signal conditioner 22. The signal conditioner converts the signals into a suitable format for recording by a recorder 24. This data will be exemplified hereinafter in FIG. 2.

The present apparatus utilizes a magnetic pickup or coil 28 which detects passage of magnetic markers 30 which are placed in the wireline 14. The markers are spaced evenly and are precisely located from one another. The magnetic markers 30 thus extend the full length of the wireline 14. The space between the markers 30 is represented by the symbol B which is shown in FIG. 1. In similar fashion, a magnetic mark 30 is formed on the wireline 14 above the sonde 12 and is separated from the sonde by the measured distance A. This distance A is measured to a specific location on the sonde, for instance, at the mid point on the sonde. The precise location is based on the particular deployed measuring equipment in the sonde. Thus, the sonde (of substantial length) encloses a sensor or transducer at the region 32. Accordingly, the distance A is measured to that portion of the sonde.

The distance A can be equal to or different from the distance B. Both distances will be discussed in detail hereinafter to define the relationships necessary for measuring total depth and making appropriate corrections. The distance C is the measured distance between the magnetic mark the coil 28. A pair of calibrated encoder wheels 34 are frictionally contacted against the wireline 14 to measure wireline movement. Preferably, redundant or duplicate calibrated encoder wheels are used. They are preferably manufactured with a precise circumference. They preferably have an outer circumference which is adapted to contact and engage the wireline 14 so that slippage is held to a minimum. The wheels can be made of materials which have a very low temperature expansion coefficient to thereby reduce variations with temperature. Ideally, the surface of the wheel is kept clean, for example, by removal of drilling mud to avoid build-up on the circumference of the wheels 34. Mud build-up may change the circumference and thereby change the measurements. Indeed, it is possible for drilling mud to accumulate on the wireline or on both the wheels, and perhaps vary wheel size with each rotation. It is also possible in freezing weather that ice may accumulate and thereby change the size of the wheels. Many factors may slightly vary the dynamic measurements made by the adjacent wheels 34. For this reason, it is desirable to use two separate wheels and provide separate pulse outputs from each wheel so that the pulse encoded data can be compared. The wheels preferably operate independent of one another and yet make similar measurements on the wireline. The similar measurements are obtained by rotating the wheels to create a pulse with each increment of rotation. The number of pulses required for a full revolution of each wheel is a scale factor which can be varied. In the preferred and illustrated embodiment, it is best that separate pulse trains are formed, one for each wheel, so that they can be compared. This enables the two separate pulse trains to be evaluated as they are processed including comparison to determine errors in measurement, or forming an average at an averaging circuit.

A scale factor is selected for the measuring wheels 34. As the wheel rotates through a particular angular deflection, a pulse is created. The scaling necessary can vary the number of pulses per circle. One revolution of each of the wheels 34 can be represented by a number N of pulses which pulses represent linear movement of the wireline 14 equal to the circumference of the wheels. The wheels 34 form duplicate pulse trains. That is, the two pulse trains from the two wheels are duplicate provided the wheels do not slip but rotate at the same rate. Two pulse train are compared to measure similarities in the two pulse trains. Both pulse trains can be used or alternatively only one can be used in the apparatus. The selected or average pulse train is provided to a summing circuit 36. That connects with a register 38 which forms an indication of corrected depth. Pulses which add to or subtract from the pulse train are provided by means of a feedback loop 40. The feedback loop provides pulses indicative of depth correction as will be described. The pulses from the two encoder wheels 34 are provided with the correction for depth and this data is input into a CPU 42 where certain conversions are made. This will be described in detail hereinafter.

The numeral 46 identifies a tension measuring device contacted against the wireline. This measures tension at the wellhead It provides an encoded signal on a signal line indicative of wireline tension. This signal is used to determine wireline stretch as will be described.

TYPICAL CIRCUMSTANCES INVOLVED IN USE

Assume that the well 10 is 20,000 feet in depth. Assume also that the sonde and associated weight bars attached thereto provide a weight of 1,000 pounds on the wireline. Assume further that the well is substantially vertical so that the sonde is supported primarily by hanging and does not slide up the side of the inclined or deviated borehole. Assume also, that the sonde has been lowered to the bottom and that a logging trip is to be made wherein the sonde 12 is to be retrieved from the well at a fixed velocity. Assume further that the sonde 12 will snag the obstruction 20 when traveling upwardly. Assume also that the formation of interest is just above the snag. The sonde is retrieved from the bottom of the borehole 10 at a fixed velocity. This is accomplished by spooling the wireline 14 onto the reel 18. Measurements are made by the sonde as it traverses the borehole. The particular type of measuring instrument carried in the sonde, being one or more, is not important to the present disclosure, and can be varied widely. Data is input to the recorder 24 and is recorded as a function of depth, meaning primarily corrected depth as determined by the present apparatus. The other variables can also be recorded including cable tension, sonde speed, and depth correction. A log quality chart as will be described in FIG. 2 can also be compiled at this time.

Calculations for determination of the corrected depth are carried out in the CPU 42. First of all, a value of wireline stretch is calculated. The stretch S is determined by equation 1:

EQUATION 1:

-continued
$$S = KD \frac{W - Tw - 2R}{2}$$

In this equation, D represents the depth of the sonde 12 in the borehole. W represents the weight or load on the wireline. R is the wireline marking tension. K is a constant of proportionality. The weight is normally sizable, as for instance 1,000 pounds. Tool weight (Tw) is normally known at the time of placing the sonde in the borehole 10. Total downhole weight is proportional to the tension T measured by the tension measuring device 46. The foregoing equation 1 can be rewritten as $S = KTD$ where T represents the measured tension. In this equation, it is not important whether the depth is corrected or uncorrected. For this reason, either value can be used.

Careful inspection of the deployed wireline 14 will show that the actual depth measured to the logging device 32 in the sonde 12 is given by equation 2 below;

$$D = A + B(X-1) - C - E - F + S \quad \text{Equation 2}$$

In the foregoing, the distance A was described heretofore and represents the distance between the bottom most magnetic mark 30 to the logging device 32 carried in the sonde 12. The distance B is the uniform spacing between magnetic marks along the wireline 14. The variable $X-1$ is the total number of spaces between magnetic marks and is obtained by counting the total number of magnetic marks on the wireline 14 to the left of the magnetic mark sensor 28. Thus, if this number represents 61 marks, then the value of $X-1$ is 60 which is multiplied by the uniform spacing. The distance C is variable and can never exceed B and is the distance between the coil and the mark 30. The stretch S was tabulated in accordance with Equation 1 and is input into Equation 2 to provide the necessary stretch value. The measured values of E and F are fixed at the time of installing the sheave 16 above the wellhead and the coil 28 along the wireline 14.

Equation 2 is measured or determined by counting the magnetic marks. The wheels 34 measurement is dependent on the pulses N which are measured from the respective encoder wheels. The wheel 34 depth measurement is described as "raw depth" or RD and is given by the of initial tool depth (ID) less KN where N is the total number of pulses from the wheel 34 and K is a constant.

$$ID - KN = RD$$

Equations 2 and 3 are subtracted to obtain a depth correction or CD. Thus, $CD = RD - D$. As will be understood, this can be zero, positive or negative. Thus, the sign must be preserved. This value is provided through the signal path 40 shown in FIG. 1 to the summing circuit 36. This yields a value of corrected depth simultaneously as it occurs.

Figure 2:
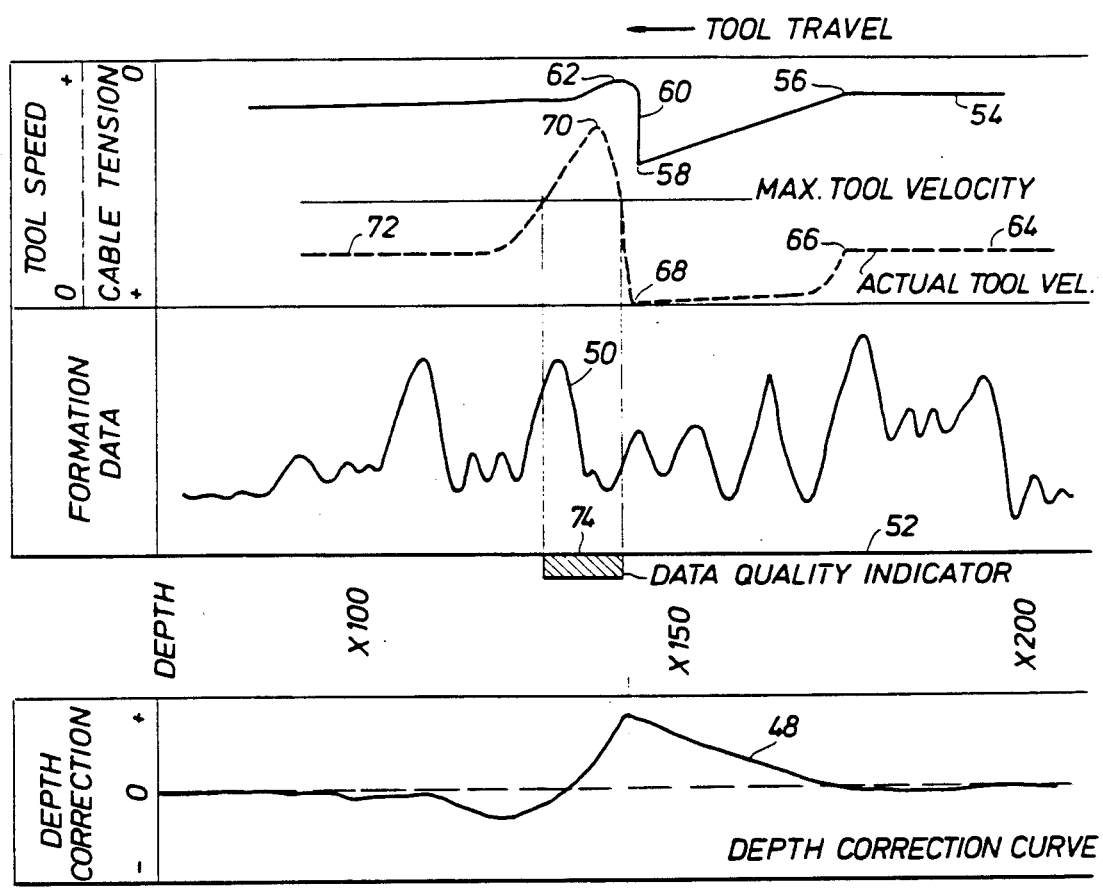

Attention is now directed to FIG. 2 of the drawings. There, tool travel is from the right side to the left side of the curves. The curve 48 identifies the depth correction curve. As observed, the sign can be either positive or negative. The curve 50 identifies formation data. The precise nature of this can vary and can be any typical variable which is obtained during logging operations. Both the curves 48 and 50 are recorded adjacent a depth measurement at 52. The curve 54 identifies cable tension. The curve 54 shows that the tension is relatively fixed as long as the sonde is able to move freely. It has an inflection point at 56 and increases to a maximum value 58. This occurs where the sonde is snagged and held by the obstacle 20. When the sonde breaks free, the curve shows an instant change in tension at 60 and some overshoot at 62. The curve then returns to the steady state value. This ramp with overshoot represents oscillating movement where the sonde settles at a specified tension on the cable after breaking free of the obstacle 20. Just as the adjacent curve 56 shows where tension increases as a result of snagging, tool velocity is identified by the curve 64. When the tool snags, the velocity quickly decreases at 66, illustrative of the snagging. Velocity can actually approach or reach zero at 68. Suddenly, when the obstacle 20 is overcome and the sonde breaks free, the velocity will change radically and will jump to a peak velocity at 70. Thereafter, the velocity will drop again during the oscillating motion and restore velocity to tho level 72. The curves illustrative of tool speed and cable tension indicate a region where the data quality is poor. This region is identified at 74 on the depth scale. In this region, it is possible for the tool to move so rapidly that the data will be erroneous as a result Moreover, the data quality indicator 74 can be used to assure that formation data 50 is given proper weight. Indications within the region 74 may be less useful than other data.

The quality indicator shown in FIG. 2 is indicated continuously. In the presentation in FIG. 2, quality is presented in binary fashion. This can be altered by presenting the quality with additional incremental representations as for example with a weighting indicative of poor data quality. As shown in FIG. 2, the zone 74 indicates suspect data because the tool exceeded the maximum tool velocity permitted. In another aspect, the region at which tool velocity drops near to zero at 68 may in some instances be a region of suspect data.

The recorder preferably presents the formation data 50 in the appropriate format required for that type of data. Since many types of tools can be implemented, the particular mode of data presentation will vary depending on the method customarily used for this type of equipment.

In summary, the present apparatus is particularly able to provide a curve indicative of un acceptable data. While the foregoing is directed to the preferred embodiment, the scope thereof is determined by the claims which follow.

What is claimed is:

1. In a system for measuring length of a wireline in a well borehole, wherein the wireline supports a logging tool and is spooled onto a surface located reel, an apparatus for indicating tool velocity outside tool velocity limits during upward travel while logging the well, comprising:
    (a) calibrated encoder wheel means located at the surface to contact against the wireline extending into the well borehole for measuring the wireline wherein the measurement is encoded by said wheel means rotation to form pulses proportional to wireline movement;
    (b) means connected to said calibrated encoder wheel means and responsive to the pulses formed thereby for determining depth of a tool on the wireline in the well borehole;

(c) surface located tension measuring means at the surface for measuring tension in the wireline to form a signal indicative of wireline tension;

(d) means connected to said tension measuring means and responsive to the signal formed thereby for forming a wireline stretch correction;

(e) means for correcting the depth by adding the stretch correction of the wireline to the depth wherein the stretch correction is continuously formed and continuously added to length of wireline in the borehole; and (f) surface located means for determining logging tool velocity outside selected tool velocity limits, said surface located means forming an indication of tool velocity in the borehole outside the tool velocity limits related to tool depth in the well borehole said surface located means responding to measurements by said wheel means and said tension measuring means.

2. The apparatus of claim 1 wherein said calibrated encoder wheel means includes first and second duplicate and redundant encoder wheels forming separate pulse trains indicative of wireline movement.

3. The apparatus of claim 1 including output means indicating depth from the pulses from said calibrated encoder wheel means, and also including summing means for adding or subtracting depth corrections to the indicated depth at said output means.

4. The apparatus of claim 1 including:

(a) means cooperative with the wireline for measuring wireline movement at the surface and providing an indication of tool depth of a tool suspended on the wireline in the borehole;

(b) means for calculating tool velocity; and (c) means for forming an output signal of tool velocity compared to specified limits and forming an indication that tool velocity compared to the limits.

5. The system of claim 1 including means measuring passage of magnetic markers on the wireline.

6. The apparatus of claim 5 wherein said measuring means includes a coil detecting magnetic marker movement.

7. A system for measuring length of a wireline in a well borehole, wherein the wireline supports a logging tool and is spooled onto a surface located reel and the wireline is marked with uniformly spaced magnetic marker therealong, and including an apparatus for indicating tool velocity outside velocity limits during upward travel while logging the well, comprising:

(a) magnetic marker detector means cooperative with the wireline for measuring the wireline extending into the well borehole wherein the measurement forms pulses in relation to wireline length in the borehole;

(b) depth determining means located at the surface and connected to said marker detector means and responsive to the pulses formed thereby for determining depth of a tool on the wireline in the well borehole;

(c) tension measuring means located at the surface and connected to said depth determining means for measuring tension in the wireline to form a signal indicative of wireline tension; and (d) surface located means for calculating logging tool velocity and for comparing said calculated tool velocity to specified velocity limits, said means forming an indication of tool velocity in the borehole outside the tool velocity limits and related to tool depth in the well borehole, said surface located velocity calculating means being responsive to measurements generated by said tension measuring means and said magnetic marker detector means.

8. The apparatus of claim 7 wherein said detector means includes a coil means for detecting passage of magnetic markers.

9. The apparatus of claim 7 including register means indicating depth from the pulses from said detector means, and also including summing means for adding or subtracting depth corrections to the indicated depth at said register means.

10. The apparatus of claim 7 including means for recording as a function of tool depth in the borehole an indication of log quality.

* * * * *